US011800003B2

(12) United States Patent
Yasuda et al.

(10) Patent No.: US 11,800,003 B2
(45) Date of Patent: Oct. 24, 2023

(54) VEHICLE-MOUNTED SYSTEM CAPABLE OF MAKING HANDS-FREE CALL

(71) Applicant: Panasonic Intellectual Property Management Co., Ltd., Osaka (JP)

(72) Inventors: Keisuke Yasuda, Kanagawa (JP); Tomoo Oota, Kanagawa (JP); Yoshinori Ebata, Kanagawa (JP); Hideo Tagata, Kanagawa (JP); Masayuki Kato, Kanagawa (JP); Toshihiro Ide, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/686,248

(22) Filed: Mar. 3, 2022

(65) Prior Publication Data

US 2022/0286546 A1    Sep. 8, 2022

(30) Foreign Application Priority Data

Mar. 5, 2021 (JP) .................................. 2021-035230

(51) Int. Cl.
*H04M 1/00* (2006.01)
*H04M 1/60* (2006.01)

(52) U.S. Cl.
CPC ................................. *H04M 1/6091* (2013.01)

(58) Field of Classification Search
CPC ............ H04M 1/6091; H04M 1/6075; H04M 1/6066; H04M 2250/02; H04M 1/72513
See application file for complete search history.

(56) References Cited

U.S. PATENT DOCUMENTS

2018/0059913 A1\*  3/2018  Penilla .................... H04L 67/12
2019/0289112 A1\*  9/2019  Ozaki ...................... H04M 1/57

FOREIGN PATENT DOCUMENTS

JP           2012-213243 A      11/2012

\* cited by examiner

*Primary Examiner* — Nhan T Le
(74) *Attorney, Agent, or Firm* — Seed IP Law Group LLP

(57) ABSTRACT

A first communication interface communicates with a wireless apparatus to communicate an audio signal for a hands-free call by connecting to the wireless apparatus and receives first data stored in the wireless apparatus from the wireless apparatus. A storage stores the first data received by the first communication interface. A second communication interface communicates, via a communication apparatus, with a server connected to a network. The second communication interface performs communication to synchronize second data that is stored in the server and that is backup data of the first data with the first data stored in the storage.

16 Claims, 5 Drawing Sheets

FIG. 4A

| | CALL ORIGINATION HISTORY DATA | |
|---|---|---|
| A | 090×××××××× | September 10 12:15 |
| B | 090×××××××× | September 10 12:10 |
| C | 090×××××××× | September 10 12:05 |
| D | 090×××××××× | September 10 11:53 |
| E | 090×××××××× | September 10 11:09 |
| F | 090×××××××× | September 10 10:45 |

FIG. 4B

| | CALL ORIGINATION HISTORY DATA | |
|---|---|---|
| A | 090×××××××× | September 10 12:15 |
| B | 090×××××××× | September 10 12:10 |
| A | 090×××××××× | September 10 12:05 |
| D | 090×××××××× | September 10 11:53 |
| B | 090×××××××× | September 10 11:09 |
| F | 090×××××××× | September 10 10:45 |

140

VEHICLE-MOUNTED SYSTEM CAPABLE OF MAKING HANDS-FREE CALL

BACKGROUND

1. Field

The present disclosure relates to communication technology and, more particularly, to a vehicle-mounted system capable of making a hands-free call.

2. Description of the Related Art

When a user carrying a cell phone gets on a vehicle and the cell phone enters a near field communication range of the vehicle-mounted apparatus, the cell phone and the vehicle-mounted apparatus establish a communication line, and the cell phone automatically transfers call origination history data, call reception history data, and telephone director data to the vehicle-mounted apparatus. Upon receiving the call origination history data and call reception history data from the cell phone, the vehicle-mounted apparatus stores the call origination history data and call reception history data in the storage along with the call origination history data and call reception history data of the apparatus. This makes it possible to perform an operation to originate a call according to the call origination history data and call reception history data stored in the storage (see, for example, patent literature [Patent literature 1] JP2012-213243

As the cell phone and the vehicle-mounted apparatus establish a communication line and the cell phone automatically transfers the call origination history data, the call reception history data, and the telephone directory data to the vehicle-mounted apparatus, it is possible to use the call origination history data and call reception history data in an operation to originate a call in the vehicle-mounted apparatus. If a communication line to the cell phone cannot be established, however, the vehicle-mounted apparatus cannot acquire the call origination history data and call reception history data. For improvement of user convenience, it is desired that the vehicle-mounted can acquire the call origination history data and call reception history data from a source other than the cell phone.

SUMMARY

The present invention addresses the above-described issue, and a purpose thereof is to provide a technology of acquiring data in a variety of situations.

A vehicle-mounted system according to a mode of the present disclosure includes: a vehicle-mounted apparatus that makes a hands-free call of a wireless apparatus possible; and a communication apparatus that connects the vehicle-mounted apparatus to a network. The vehicle-mounted apparatus includes: a first communication interface that communicates with the wireless apparatus to communicate an audio signal for a hands-free call by connecting to the wireless apparatus and receives first data stored in the wireless apparatus from the wireless apparatus; a storage that stores the first data received by the first communication interface; and a second communication interface that communicates, via the communication apparatus, with a server connected to the network. The second communication interface performs communication to synchronize second data that is stored in the server and that is backup data of the first data with the first data stored in the storage.

Optional combinations of the aforementioned constituting elements, and implementations of the disclosure in the form of methods, apparatuses, systems, recording mediums, and computer programs may also be practiced as additional modes of the present disclosure.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIGS. 4A-4B show screens displayed on the display interface of FIG. 2; and

DETAILED DESCRIPTION

The invention will now be described by reference to the preferred embodiments. This does not intend to limit the scope of the present invention, but to exemplify the invention.

A brief summary will be given before describing the present disclosure in specific details. An embodiment of the present disclosure relates to a vehicle-mounted system including a vehicle-mounted apparatus mounted to a vehicle and a wireless apparatus connected to the vehicle-mounted apparatus. An example of the vehicle-mounted apparatus is electronic equipment such as a navigation apparatus, and an example of the wireless apparatus is a smartphone or a cell phone. By connecting to the wireless apparatus, the vehicle-mounted apparatus can make a hands-free call of the wireless communication. In the state in which the wireless apparatus is connected to the vehicle-mounted apparatus, call origination history data and call reception history data of the wireless apparatus are transferred from the wireless apparatus to the vehicle-mounted apparatus by a transfer protocol. The vehicle-mounted apparatus displays the transferred call origination history data and call reception history data, and the user refers to the displayed call origination history data and call reception history data to select a new destination of call and make a hands-free call. If the vehicle-mounted apparatus cannot connect to the wireless apparatus, the vehicle-mounted apparatus cannot acquire the call origination history data and call reception history data. In order for the vehicle-mounted apparatus to acquire the call origination history data and call reception history data in such a situation, it is desired that the vehicle-mounted apparatus can acquire the call origination history data and call reception history data from a source other than the wireless apparatus.

In this embodiment, a communication apparatus is mounted to the vehicle in addition to the vehicle-mounted apparatus, and the vehicle-mounted apparatus and the communication apparatus are connected. The communication apparatus and the wireless apparatus can connect to a network and communicate with a server connected to the network. Therefore, the vehicle-mounted apparatus and the wireless apparatus share the call origination history data and call reception history data via the server. Therefore, the vehicle-mounted apparatus refers to the call origination history data and call reception history data stored in the server even if the vehicle-mounted apparatus cannot connect to the wireless apparatus.

Figure 1:
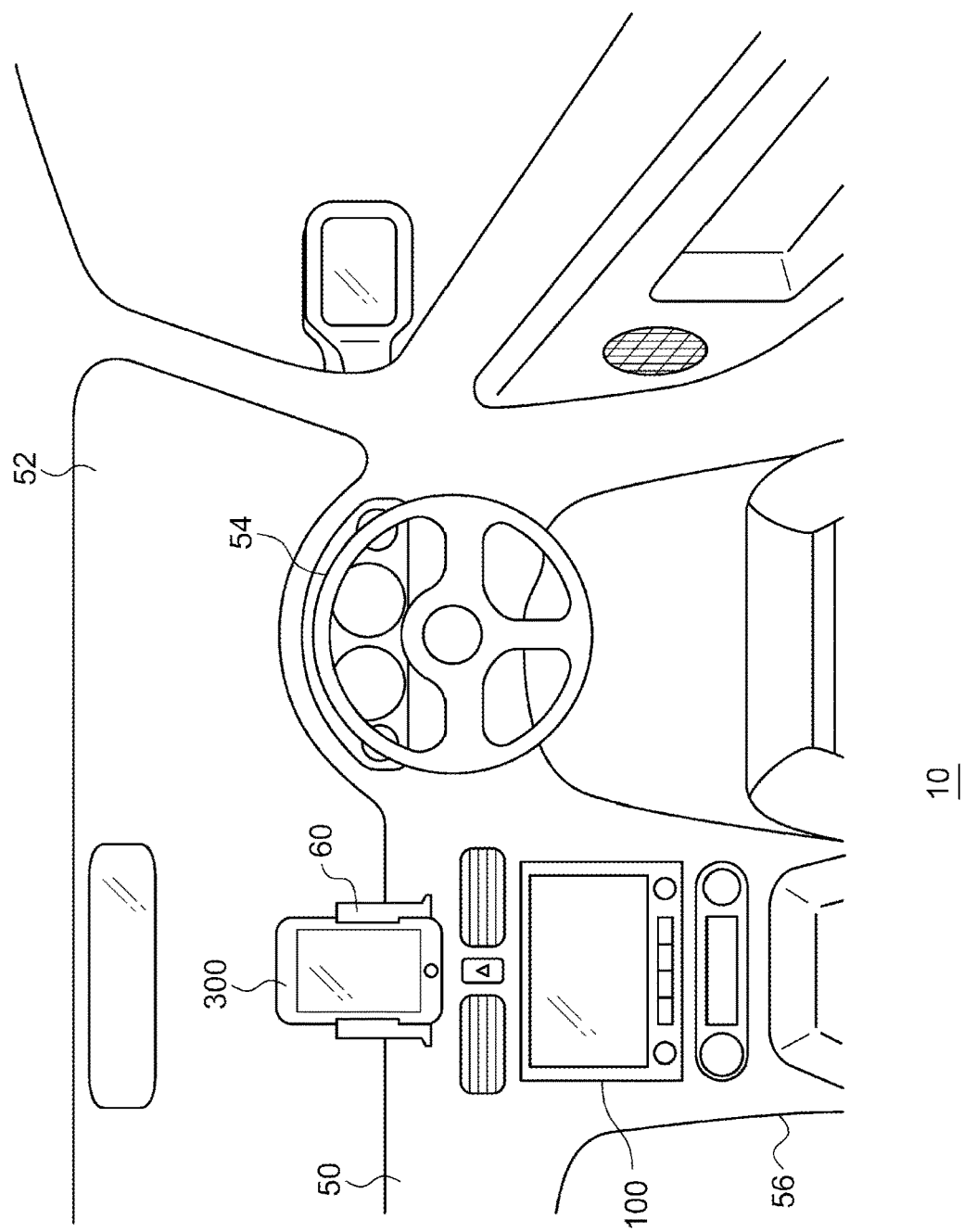
FIG. 1 shows a structure of the vehicle interior of a vehicle according to the embodiment.

FIG. 1 shows a structure of the vehicle interior of a vehicle 10. A windshield 52 is provided in front of a dashboard 50 provided frontward in the vehicle interior. A steering wheel 54 is provided to the right of the dashboard 50. Alternatively, the steering wheel 54 may be provided to the left of the dashboard 50. A center console 56 extending vertically is provided at the central portion of the dashboard 50. A vehicle-mounted apparatus 100 is set within the center console 56. A mounting table 60 is provided above the center console 56. The mounting table 60 supports a wireless apparatus 300. The wireless apparatus 300 may be held by the user. The wireless apparatus 300 and the vehicle-mounted apparatus 100 can be connected wirelessly or by wire. For example, the vehicle-mounted apparatus 100 connects to the wireless apparatus 300 by near field communication like Bluetooth (registered trademark) to enable the wireless apparatus 300 to make a hands-free call.

The wireless apparatus 300 is connected to a cloud server (hereinafter, "server") via the Internet. However, connection between the vehicle-mounted apparatus 100 and the wireless apparatus 300 and connection between the wireless apparatus 300 and the server are made independently. In the embodiment, on the other hand, the vehicle-mounted apparatus 100, the wireless apparatus 300, and the server are coordinated to enable the vehicle-mounted apparatus 100 to acquire the call origination history data and call reception history data from a source other than the wireless apparatus 300.

Figure 2:
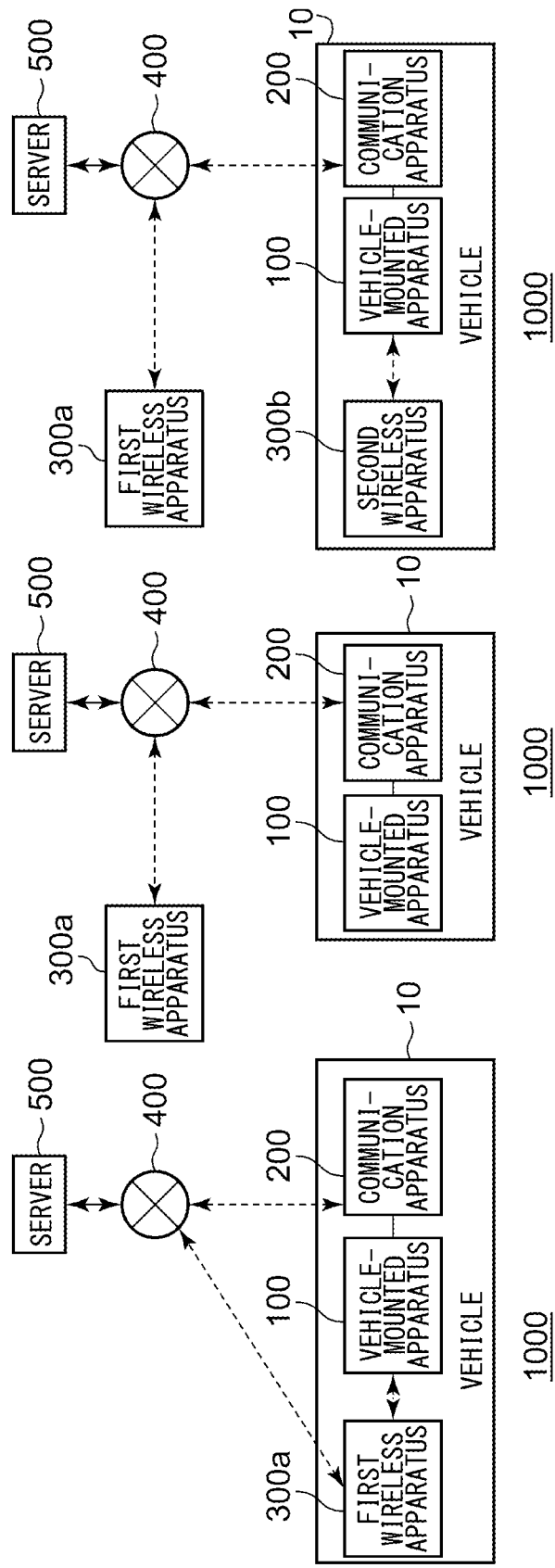
FIGS. 2A-2C show a configuration of a vehicle-mounted system according to the embodiment.

FIGS. 2A-2C show a configuration of a vehicle-mounted system 1000. FIG. 2A shows the first mode of the embodiment. The vehicle-mounted system 1000 includes the vehicle-mounted apparatus 100, a communication apparatus 200, a first wireless apparatus 300a, a network 400, and a server 500. The vehicle-mounted apparatus 100 and the communication apparatus 200 are mounted to the vehicle 10. The communication apparatus 200 is connected to the vehicle-mounted apparatus 100 by universal serial bus (USB), controller area network (CAN), on-vehicle local area network (LAN) to communicate with the vehicle-mounted apparatus 100. The communication apparatus 200 connects to the network 400 by long term evolution (LTE) or 5G (hereinafter, "cellular communication") by connecting to a base station apparatus (not shown) of LTE or 5G. The server 500 is connected to the network 400. Therefore, the communication apparatus 200 connects the vehicle-mounted apparatus 100 to the network 400. This enables the vehicle-mounted apparatus 100 to communicate with the server 500 via the communication apparatus 200 and the network 400.

The first wireless apparatus 300a is generically referred to as the wireless apparatus 300. The first wireless apparatus 300a is exemplified by a smartphone or a cell phone. As described above, the first wireless apparatus 300a is connected to the vehicle-mounted apparatus 100 by near field communication to communicate with the vehicle-mounted apparatus 100. The first wireless apparatus 300a connects to the network 400 by cellular communication by connecting to a base station apparatus (not shown) of LTE or 5G. Therefore, the first wireless apparatus 300a can communicate with the server 500 via the network 400.

When a call is made in the first wireless apparatus 300a, call origination history data and call reception history data are generated in the first wireless apparatus 300a. By bringing the first wireless apparatus 300a into the vehicle 10, near field communication is performed between the first wireless apparatus 300a and the vehicle-mounted apparatus 100. The first wireless apparatus 300a transmits the call origination history data and call reception history data to the vehicle-mounted apparatus 100.

The first wireless apparatus 300a connects to the server 500 by cellular communication via the network 400 and transmits the call origination history data and call reception history data to the server 500. The server 500 stores the call origination history data and call reception history data. The vehicle-mounted apparatus 100 connects to the server 500 via the communication apparatus 200 and the network 400 and receives the call origination history data and call reception history data from the server 500. Therefore, the call origination history data and call reception history data are synchronized between the server 500 and the vehicle-mounted apparatus 100.

The user in the vehicle 10 uses the vehicle-mounted apparatus 100 to make a hands-free call of the first wireless apparatus 300a. In that process, the call origination history data and call reception history data stored in the vehicle-mounted apparatus 100 may be displayed or used in the hands-free call.

FIG. 2B shows a second mode of the embodiment. The figure shows a state in which the user does not bring the first wireless apparatus 300a into the vehicle 10. The first wireless apparatus 300a connects to the server 500 by cellular communication via the network 400 and transmits the call origination history data and call reception history data to the server 500. The server 500 stores the call origination history data and call reception history data. The vehicle-mounted apparatus 100 connects to the server 500 via the communication apparatus 200 and the network 400 and receives the call origination history data and call reception history data from the server 500. The user in the vehicle 10 uses the vehicle-mounted apparatus 100 to make a hands-free call of the communication apparatus 200. In that process, the call origination history data and call reception history data stored in the vehicle-mounted apparatus 100 may be displayed or used in the hands-free call.

FIG. 2C shows a third mode of the embodiment. The figure shows a state in which the user does not bring the first wireless apparatus 300a into the vehicle 10, and another user brings a second wireless apparatus 300b into the vehicle 10. The first wireless apparatus 300a connects to the server 500 by cellular communication via the network 400 and transmits the call origination history data and call reception history data to the server 500. The server 500 stores the call origination history data and call reception history data. The vehicle-mounted apparatus 100 connects to the server 500 via the communication apparatus 200 and the network 400 and receives the call origination history data and call reception history data from the server 500.

Near field communication is performed between the second wireless apparatus 300b and the vehicle-mounted apparatus 100. The user in the vehicle 10 uses the vehicle-mounted apparatus 100 to make a hands-free call of the second wireless apparatus 300b. In that process, the call origination history data and call reception history data stored in the vehicle-mounted apparatus 100 may be displayed or used in the hands-free call.

Figure 3:
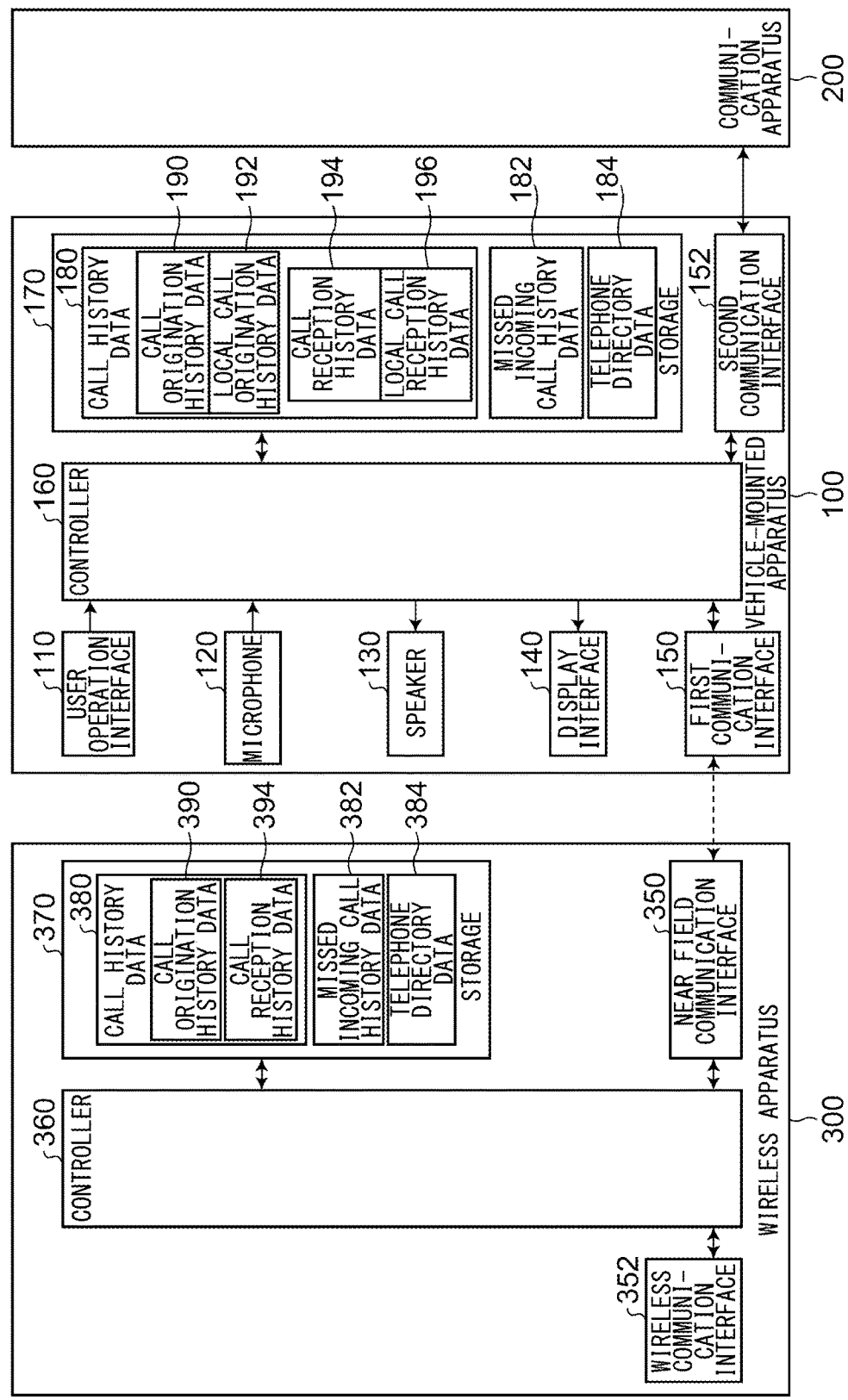
FIG. 3 shows a configuration of the vehicle-mounted apparatus, the communication apparatus, and the wireless apparatus of FIGS. 2A-2C.

FIG. 3 shows a configuration of the vehicle-mounted apparatus 100, the communication apparatus 200, and the wireless apparatus 300. The vehicle-mounted apparatus 100 includes a user operation interface 110, a microphone 120, a speaker 130, a display interface 140, a first communication interface 150, a second communication interface 152, a controller 160, and a storage 170. The wireless apparatus 300 includes a near field communication interface 350, a wireless communication interface 352, a controller 360, and a storage 370. The wireless apparatus 300 may be the first wireless apparatus 300a or the second wireless apparatus 300b of FIGS. 2A-2C. The process in the vehicle-mounted apparatus 100 and the wireless apparatus 300 will be described in the order (1) the first mode, (2) the second mode, and (3) the third mode.

(1) First Mode

The wireless apparatus 300 corresponds to the first wireless apparatus 300a of FIG. 2A. The wireless communication interface 352 of the wireless apparatus 300 performs wireless communication by cellular communication by connecting to a base station apparatus (not shown) of LTD or 5G. The controller 360 performs a call origination process and a call reception process by cellular communication by controlling the wireless apparatus 300. When the user enters a telephone number of a destination of call by using a dial key (not shown) and then uses a call origination key (not shown) in the call origination process, a call is originated from the wireless communication interface 352 with the telephone number being the destination of call. Further, when the wireless communication interface 352 receives an incoming call signal from the base station apparatus in the call reception process, the controller 360 receives the telephone number of the source of call from the base station apparatus as an incoming telephone number. Further, when the user uses a call reception key (not shown), the controller 360 causes the wireless communication interface 352 to respond to incoming call.

The controller 360 is connected to the storage 370. The storage 370 stores call history data 380, missed incoming call history data 382, and telephone directory data 384. The call history data 380 includes call origination history data 390 and call reception history data 394. The call origination history data 390 is a collection of a plurality of sets of data each comprised of the correspondence between the originated telephone number input in the call origination process and the date and time of call origination. The call reception history data 394 is a collection of a plurality of sets of data each comprised of the correspondence between the received telephone number received in the call reception process and the date and time of call reception. The missed incoming call history data 382 is a collection of a plurality of sets of data each comprised of the received telephone number received when an incoming call is not responded to and the date and time of call reception. In the call origination history data 390, the call reception history data 394, and the missed incoming call history data 382, the latest 20 sets of data are stored, for example. When a call origination process, a call reception process, or a missed incoming call occurs newly, the call origination history data 390, the call reception history data 394, and the missed incoming call history data 382 are updated. The telephone directory data 384 is a collection of a plurality of sets of data each comprised of the correspondence between a telephone number and a registered name. When displaying the originated telephone number or the received telephone number on a display (not shown), the controller 360 may display the registered name by using the telephone directory data 384.

The near field communication interface 350 performs near field communication. The near field communication interface 350 is compatible with hands-free profile (HFP) for making a hands-free call and phone book access profile (PBAP) for transferring the call origination history data 390, etc. For example, the near field communication interface 350 makes a PBAP connection immediately after establishing a communication channel with the vehicle-mounted apparatus 100 and automatically transfers the call origination history data 390, the call reception history data 394, the missed incoming call history data 382, and the telephone directory data 384 then stored.

The wireless communication interface 352 performs cellular communication and connects to the network 400 (FIG. 1). Since the server 500 (FIG. 1) is connected to the network 400, the wireless communication interface 352 can communicate with the server 500 via the network 400. The wireless communication interface 352 transfers the call origination history data 390, the call reception history data 394, the missed incoming call history data 382, and the telephone directory data 384 to the server 500. The server 500 stores the call origination history data 390, the call reception history data 394, the missed incoming call history data 382, and the telephone directory data 384 thus received. The call origination history data 390, the call reception history data 394, the missed incoming call history data 382, and the telephone directory data 384 stored in the server 500 can be said to backup data of the call origination history data 390, the call reception history data 394, the missed incoming call history data 382, and the telephone directory data 384 stored in the wireless apparatus 300.

The vehicle-mounted apparatus 100 is, for example, a navigation apparatus. To realize the navigation functionality, the vehicle-mounted apparatus 100 includes a processing interface capable of performing a positioning function for identifying the position of the vehicle 10, a map data reading function of reading map data, and a route finding function for finding a route from the current position to the destination.

The first communication interface 150 performs near field communication and can communicate with the near field communication interface 350 of the wireless apparatus 300. Like the near field communication interface 350, the first communication interface 150 is compatible with HFP and PBAP. Therefore, the first communication interface 150 communicates with the wireless apparatus 300 to communicate an audio signal for a hands-free call, by connecting to the wireless apparatus 300 and performing HFP. Further, the first communication interface 150 receives, from the wireless apparatus 300, the call history data 380, the missed incoming call history data 382, and the telephone directory data 384 stored in the wireless apparatus 300. The call history data 380 is the data indicating the subject to which the wireless apparatus 300 made a call in the past and is the data received by the first communication interface 150. The data may be referred to as "first data". Further, the telephone directory data 384 may be included in the first data.

The controller 160 controls the first communication interface 150, etc. to perform a transfer process for the call history data 380 and a hands-free call process. To perform the transfer process, the wireless apparatus 300 configured for by near field communication is pre-registered in the first communication interface 150. For registration, a publicly known technology may be used, and a description thereof is omitted here. By making such a registration, the first communication interface 150 is prevented from making HFP or PBAP communication with an unregistered wireless apparatus 300. A plurality of wireless apparatuses 300 configured for communication may be registered in the first communication interface 150. In that process, an order of priority is set for the wireless apparatuses 300. The first communication interface 150 connects to the wireless apparatus 300 having a high priority.

The controller 160 of the vehicle-mounted apparatus 100 selects the wireless apparatus 300 having a high priority as being configured for HFP communication and causes the first communication interface 150 to connect to the selected wireless apparatus 300 by HFP. When connection by HFP is successful, the controller 160 causes the first communication interface 150 to terminate the HFP connection with the wireless apparatus 300. Subsequently, the controller 160 causes the first communication interface 150 to communicate with the wireless apparatus 300 by PBAP.

After the connection is established, the controller 160 requests the wireless apparatus 300 to transfer the call history data 380, the missed incoming call history data 382, and the telephone directory data 384 via the first communication interface 150. When the wireless apparatus 300 transfers the call history data 380, the missed incoming call history data 382, and the telephone directory data 384 in response to the request, the first communication interface 150 of the vehicle-mounted apparatus 100 receives the call history data 380, the missed incoming call history data 382, and the telephone directory data 384 from the wireless apparatus 300. The controller 160 stores the call origination history data 390 of the call history data 380, the call reception history data 394 of the call history data 380, the missed incoming call history data 382, and the telephone directory data 384 thus received in the storage 170 as call origination history data 190, call reception history data 194, missed incoming call history data 182, and telephone directory data 184. After the data is transferred, the controller 160 causes the first communication interface 150 to terminate the PBAP connection with the wireless apparatus 300. Subsequently, the controller 160 causes the first communication interface 150 to connect to the wireless apparatus 300 by HFP.

When the user uses the user operation interface 110 to request the call history data to be displayed for a hands-free call, the controller 160 causes the display interface 140 to display the call origination history data 190 or the call reception history data 194 stored in the storage 170. The user operation interface 110 is comprised of a touch key formed in the display interface 140, detects the user's operation, and outputs a user operation signal indicating the content of user operation to the controller 160. Further, when the display interface 140 receives a display signal from the controller 160, the display interface 140 displays a screen determined by the input display signal. In particular, the display interface 140 displays the call origination history data 190 and call reception history data 194 received by the first communication interface 150. The display in the display interface 140 will be described in detail later.

When the user uses the user operation interface 110 to request the missed incoming call data to be displayed for a hands-free call, the controller 160 may cause the display interface 140 to display the missed incoming call history data 182 stored in the storage 170. When the user uses the user operation interface 110 to request the telephone directory data to be displayed for a hands-free call, the controller 160 may cause the display interface 140 to display the telephone directory data 184 stored in the storage 170.

When the user performs a user operation to originate a call, the controller 160 performs a call origination process to originate a call to the telephone number entered by the dial key, the telephone number corresponding to the selected call origination history, or the telephone number corresponding to the selected call reception history. The call origination process is initiated by the wireless apparatus 300 via the first communication interface 150. The microphone 120 receives the sound generated by the user, and the speaker 130 outputs the sound. In particular, the microphone 120 and the speaker 130 are used to make a hands-free call of the wireless apparatus 300. Therefore, when near field communication is performed between the first communication interface 150 and the near field communication interface 350 of the wireless apparatus 300, the controller 160 causes the first communication interface 150 to transmit an audio signal including the sound received by the microphone 120 to the wireless apparatus 300. The audio signal is transmitted from the wireless communication interface 352 of the wireless apparatus 300 to the cellular network. Meanwhile, the audio signal that the wireless communication interface 352 of the wireless apparatus 300 receives from the cellular network is transmitted from the near field communication interface 350 to the first communication interface 150. The controller 160 causes the speaker 130 to output the sound included in the audio signal received by the first communication interface 150.

When the call origination process is terminated, the controller 160 deletes the oldest call origination history data of the call origination history data 190 stored in the storage 170. The controller 160 appends the call origination history newly generated in the call origination process to local call origination history data 192. The local call origination history data 192 is the data including the call origination history generated in the hands-free call and is the data indicating the subject called when the hands-free call was made by the vehicle-mounted apparatus 100. Thereafter, the combination of the call origination history data 190 and the local call origination history data 192 will be the new call origination history data, and the hands-free call is continued. The information on a plurality of destinations of call included in the combination of the call origination history data 190 and the local call origination history data 192 is "destination of call information", and the destination of call information includes, for example, the registered name, telephone number, and date and time of call origination.

Meanwhile, the controller 160 performs a call reception process when the user performs a call reception operation. In the call reception process, too, the user operation interface 110, the microphone 120, and the speaker 130 are used. When the call reception process is terminated, the controller 160 deletes the oldest call reception history data of the call reception history data 194 stored in the storage 170. The controller 160 appends the call reception history newly generated in the call reception process to local call reception history data 196. The local call reception history data 196 is the data including the call reception history generated in the hands-free call and is the data indicating the subject that made the hands-free call made in the vehicle-mounted apparatus 100. Thereafter, the combination of the call reception history data 194 and the local call reception history data 196 will be the new call reception history data, and the hands-free call is continued. The information on a plurality of sources of call included in the combination of the call reception history data 194 and the local call reception history data 196 is "source of call information", and the source of call information includes, for example, the registered name, telephone number, and date and time of call reception.

In addition to the call origination history data 190 and the call reception history data 194, the display interface 140 also displays the local call origination history data 192 and the local call reception history data 196. The local call origination history data 192 and the local call reception history data 196 may be generically referred to as local history data. The local history data shows the subject to which the wireless apparatus 300 made a hands-free call.

FIGS. 4A-4B show screens displayed on the display interface 140. FIG. 4A shows a screen that the controller 160 causes the display interface 140 to display by selecting, when a plurality of items of destination of call information having the same telephone number are found in the call origination history data 190 and the local call origination history data 192, the destination of call information with the latest date and time of call origination. When the registered name and the telephone number are mapped one to one, the destination of call information having the same telephone number is equivalent to the destination of call information having the same registered name. "A", "B", . . . denote the registered name, "090xxx . . . " denote the telephone number, and "09/10, 12:15" denote the date and time of call origination. The figure shows that a plurality of items of destination of call information having mutually different registered names and telephone numbers are arranged in the vertical direction. In that process, the controller 160 causes the display interface 140 to display the destination of call information by changing the color each item of information. The boldness of the character may be changed for each item of destination of call information. In other words, the controller 160 causes the display interface 140 to change the display mode for each subject that the apparatus communicated with.

FIG. 4B shows a screen that the controller 160 causes the display interface 140 to display by arranging, when a plurality of items of destination of call information having the same telephone number are found in the call origination history data 190 and the local call origination history data 192, a plurality of items of destination of call information in the order of date and time of call origination. Items of destination of call information having the same registered name and telephone number are also arranged here. In that process, the controller 160 causes the display interface 140 to display the destination of call information by using the same color for the destination of call information having the same registered name and telephone number and using different colors for the destination of call information having different registered names and telephone numbers. As a result, the same color is used for two items of call destination information including the registered name "A", and different colors are used for the destination of call information including the registered name "A" and the destination of call information including the registered name "B". Reference is made back to FIG. 3.

In the call origination history data and call reception history data shown in FIGS. 4A-4B, an icon indicating the wireless apparatus 300 is displayed when the method of call origination is a hands-free call via the wireless apparatus 300, and an icon indicating the server 500 is displayed when the call is mediated by the communication apparatus 200.

The second communication interface 152 is, as described above, compatible with one of USB, CAN, and on-vehicle LAN and connects to the communication apparatus 200. The communication apparatus 200 can communicate with the vehicle-mounted apparatus 100 and can also communicate with the network 400 (FIG. 1). The communication apparatus 200 may be built in the vehicle-mounted apparatus 100. The communication apparatus 200 performs cellular communication and connects to the network 400 (FIG. 1). The server 500 (FIG. 1) is connected to the network 400 so that the communication apparatus 200 can communicate with the server 500 via the network 400. As a result, the second communication interface 152 communicates, via the communication apparatus 200, with the server 500 connected to the network 400. The second communication interface 152 receives the call origination history data 390, the call reception history data 394, the missed incoming call history data 382, and the telephone directory data 384 stored in the server 500. The call history data 380, which includes the call origination history data 390 and the call reception history data 394, is the backup data stored in the server 500 and is the data received by the second communication interface 152. The data may be referred to as "second data". The telephone directory data 384 may be included in the second data.

The controller 160 compares the date and time of update of the call origination history data 390, the call reception history data 394, the missed incoming call history data 382, and the telephone directory data 384 received from the second communication interface 152 with the date and time of update of the call origination history data 190, the call reception history data 194, the missed incoming call history data 182, and the telephone directory data 184 stored in the storage 170. When the former is later than the latter, the controller 160 stores the call origination history data 390, the call reception history data 394, the missed incoming call history data 382, and the telephone directory data 384 received from the second communication interface 152 in the storage 170 as the call origination history data 190, the call reception history data 194, the missed incoming call history data 182, and the telephone directory data 184. This is equivalent to the process of synchronizing the second data stored in the server 500 with the first data stored in the storage 170.

(2) Second Mode

The wireless communication interface 352 of the first wireless apparatus 300*a* transfers the call origination history data 390, the call reception history data 394, the missed incoming call history data 382, and the telephone directory data 384 to the server 500. The server 500 stores the call origination history data 390, the call reception history data 394, the missed incoming call history data 382, and the telephone directory data 384 thus received.

The first wireless apparatus 300*a* is not located in the vehicle 10 so that the first communication interface 150 of the vehicle-mounted apparatus 100 does not communicate with the pre-registered wireless apparatus 300 (e.g., the first wireless apparatus 300*a*). When the first communication interface 150 cannot communicate with the first wireless apparatus 300*a*, the second communication interface 152 communicates, via the communication apparatus 200, with the server 500 connected to the network 400 and receives the call origination history data 390, the call reception history data 394, the missed incoming call history data 382, and the telephone directory data 384 stored in the server 500. The controller 160 stores the call origination history data 390, the call reception history data 394, the missed incoming call history data 382, and the telephone directory data 384 received from the second communication interface 152 in the storage 170 as the call origination history data 190, the call reception history data 194, the missed incoming call history data 182, and the telephone directory data 184.

Subsequently, the vehicle-mounted apparatus 100 can make a hands-free call. The display interface 140 can display the call origination history data 190, the call reception history data 194, the missed incoming call history data 182, and the telephone directory data 184 stored in the storage for a hands-free call. In that process, the display mode may be changed for each subject that the apparatus communicated with. When making a hands-free call, the controller 160 of the vehicle-mounted apparatus 100 uses the communication apparatus 200 connected to the second communication interface 152.

(3) Third Mode

The wireless communication interface 352 of the first wireless apparatus 300a transfers the call origination history data 390, the call reception history data 394, the missed incoming call history data 382, and the telephone directory data 384 to the server 500. The server 500 stores the call origination history data 390, the call reception history data 394, the missed incoming call history data 382, and the telephone directory data 384 thus received.

The first wireless apparatus 300a is not located in the vehicle 10 so that the first communication interface 150 of the vehicle-mounted apparatus 100 does not communicate with the pre-registered wireless apparatus 300 (e.g., the first wireless apparatus 300a). On the other hand, the second wireless apparatus 300b is located in the vehicle 10 so that the first communication interface 150 can communicate with the second wireless apparatus 300b. The second wireless apparatus 300b is the wireless apparatus 300 pre-registered in the first communication interface 150 and is the wireless apparatus 300 to which a priority lower than that of the first wireless apparatus 300a is assigned.

When the first communication interface 150 cannot communicate with the first wireless apparatus 300a, the second communication interface 152 communicates, via the communication apparatus 200, with the server 500 connected to the network 400 and receives the call origination history data 390, the call reception history data 394, the missed incoming call history data 382, and the telephone directory data 384 stored in the server 500. The controller 160 stores the call origination history data 390, the call reception history data 394, the missed incoming call history data 382, and the telephone directory data 384 received from the second communication interface 152 in the storage 170 as the call origination history data 190, the call reception history data 194, the missed incoming call history data 182, and the telephone directory data 184.

Subsequently, the vehicle-mounted apparatus 100 can make a hands-free call. The display interface 140 can display the call origination history data 190, the call reception history data 194, the missed incoming call history data 182, and the telephone directory data 184 stored in the storage for a hands-free call. In that process, the display mode may be changed for each subject that the apparatus communicated with. When making a hands-free call, the controller 160 of the vehicle-mounted apparatus 100 uses the second wireless apparatus 300b connected to the first communication interface 150.

The features are implemented in hardware such as a central processing unit (CPU), a memory, or other large scale integration (LSI) of an arbitrary computer and in software such as a program loaded into a memory. The figure depicts functional blocks implemented by the cooperation of these elements. Therefore, it will be understood by those skilled in the art that the functional blocks may be implemented in a variety of manners by hardware only or by a combination of hardware and software.

Figure 5:
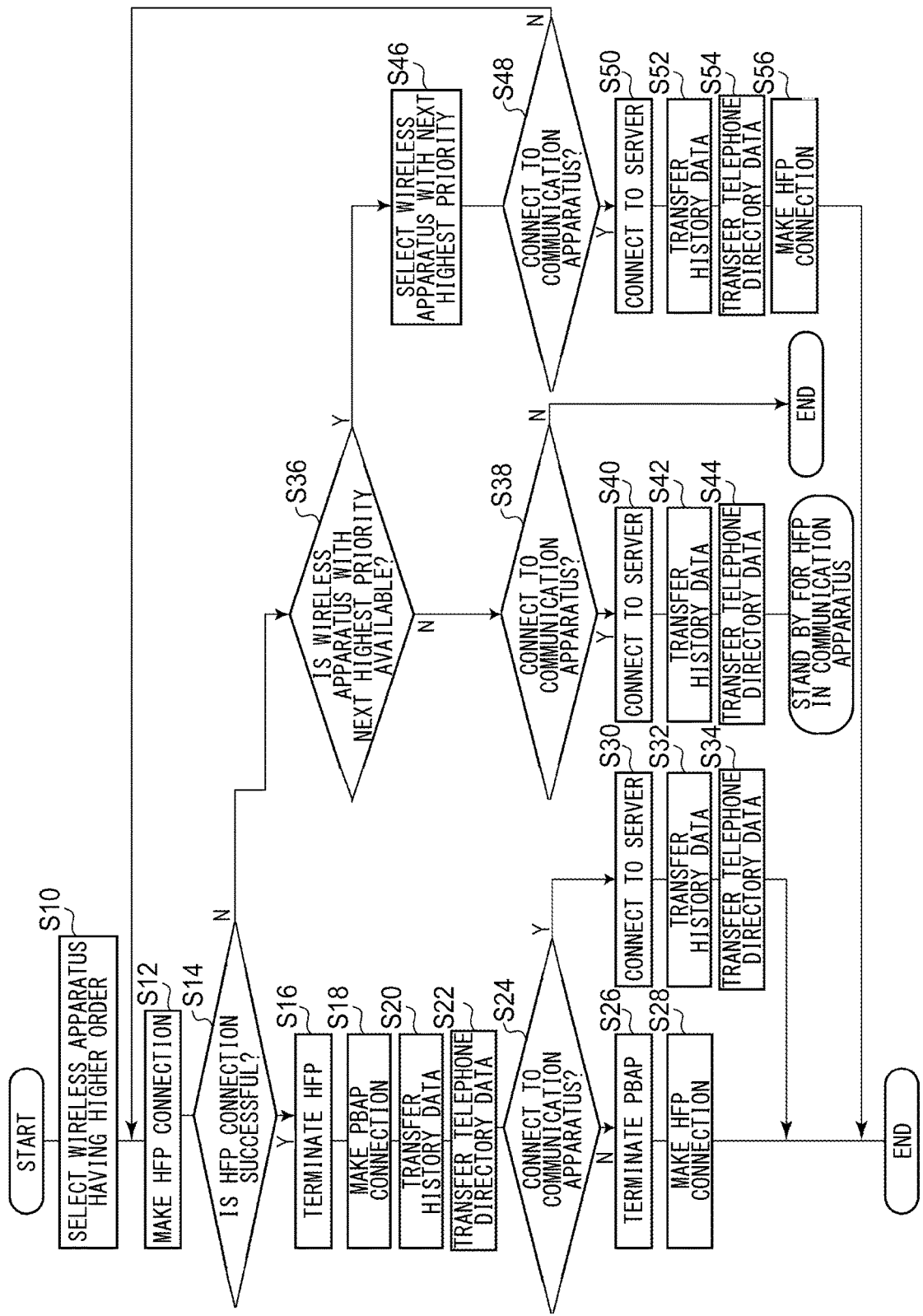
FIG. 5 is a flowchart showing a sequence of steps in the hands-free call process performed by the vehicle-mounted apparatus of FIGS. 2A-2C.

A description will be given of the operation of the vehicle-mounted system 1000 having the above-described configuration. FIG. 5 is a flowchart showing a sequence of steps in the hands-free call process performed by the vehicle-mounted apparatus 100. The first communication interface 150 selects the wireless apparatus 300 having a high priority (S10). The first communication interface 150 initiates HFP connection (S12). When the HFP connection is successful (Y in S14), the first communication interface 150 terminates HFP (S16). The first communication interface 150 initiates PBAP connection (S18). The first communication interface 150 receives the history data transferred (S20) and receives the telephone directory data transferred (S22). When the second communication interface 152 does not connect to the communication apparatus 200 (N in S24), the first communication interface 150 terminates PBAP (S26) and initiates HFP connection (S28). When the second communication interface 152 connects to the communication apparatus 200 (Y in S24), the second communication interface 152 connects to the server 500 via the communication apparatus 200 and the network 400 (S30). The second communication interface 152 receives the history data transferred (S32) and receives the telephone directory data transferred (S34).

When the HFP connection is not successful (N in S14), the wireless apparatus 300 with the next highest priority is not available (N in S36), and the second communication interface 152 connects to the communication apparatus 200 (Y in S38), the second communication interface 152 connects to the server 500 via the communication apparatus 200 and the network 400 (S40). The second communication interface 152 receives the history data transferred (S42) and receives the telephone directory data transferred (S44). When the second communication interface 152 does not connect to the communication apparatus 200 (N in S38), the process is terminated.

When the wireless apparatus 300 with the next highest priority is available (Y in S36), the first communication interface 150 selects the wireless apparatus 300 with the next highest priority (S46). When a connection is not made to the communication apparatus 200 (N in S48), control returns to step S12. When the second communication interface 152 connects to the communication apparatus 200 (Y in S48), the second communication interface 152 connects to the server 500 via the communication apparatus 200 and the network 400 (S50). The second communication interface 152 receives the history data transferred (S52) and receives the telephone directory data transferred (S54). The first communication interface 150 initiates HFP connection (S56).

According to the embodiment, the call origination history data, etc. is received from the wireless apparatus, and the call reception history data, etc. is also received from the server so that the data can be acquired in a variety of situations. Further, the call origination history data, etc. is received from the server when it is not possible to communicate with the wireless apparatus so that the data can be acquired. Further, when it is no possible to communicate with the first wireless apparatus and it is possible to communicate with the second wireless apparatus, the call origination history data, etc. received from the server is used in a hands-free call of the second wireless apparatus so that a hands-free call can be made even if it is not possible to communicate with the first wireless apparatus.

Further, since the call origination history data, etc. is received, the call origination history data produced when calls were made in the past in the wireless apparatus can be acquired. Further, since the telephone directory data is received, the telephone directory data registered in the wireless apparatus can be acquired. Further, the call history data and the local history data are displayed such that the display mode is changed for each subject that the apparatus communicated with. Therefore, the distinction between subjects that the apparatus communicated with can be made easily. Further, the distinction between subjects that the apparatus communicated with can be made easily so that the display that makes it easy for the user to recognize the content can be realized.

A summary of a mode of the present disclosure is given below. A vehicle-mounted system according to a mode of the present disclosure includes: a vehicle-mounted apparatus that makes a hands-free call of a wireless apparatus possible; and a communication apparatus that connects the vehicle-mounted apparatus to a network. The vehicle-mounted apparatus includes: a first communication interface that communicates with the wireless apparatus to communicate an audio signal for a hands-free call by connecting to the wireless apparatus and receives first data stored in the wireless apparatus from the wireless apparatus; a storage that stores the first data received by the first communication interface; and a second communication interface that communicates, via the communication apparatus, with a server connected to the network. The second communication interface performs communication to synchronize second data that is stored in the server and that is backup data of the first data with the first data stored in the storage.

According to this mode, the first data stored in the wireless apparatus is received from the wireless apparatus, and the second data, which is the backup data of the first data, is received from the server. Therefore, the data can be acquired in a variety of situations.

The second communication interface may receive the second data from the server when the first communication interface cannot communicate with the wireless apparatus, and the storage may store the second data received by the second communication interface. In this case, the second data is received from the server if it not possible to communicate with the wireless apparatus so that the data can be acquired.

The second communication interface may receive the second data from the server when the first communication interface cannot communicate with the wireless apparatus and can communicate with another wireless apparatus, the storage may store the second data received by the second communication interface, and the first communication interface may use the second data stored in the storage in a hands-free call of the other wireless apparatus. In this case, the second data received from the server is used in a hands-free call of another wireless apparatus when it is not possible to communicate with the wireless apparatus and it is possible to communicate with the other wireless apparatus. Therefore, a hands-free call can be made even if it is not possible to communicate with the wireless apparatus.

The first data may be call history data indicating a subject that the wireless apparatus communicated with in the past. In this case, the first data is the call history data so that the call history data produced when a call was made in the wireless apparatus in the past can be acquired.

The first data may be telephone directory data registered in the wireless apparatus. In this case, the first data is the telephone directory data so that the telephone directory data registered in the wireless apparatus can be acquired.

The vehicle-mounted system may further include: a display interface that displays the first data stored in the storage. The display interface may changes a display mode for each item included in the first data. In this case, the display mode is changed for each item included in the first data so that the display that makes it easy for the user to recognize the content can be realized.

The vehicle-mounted system may further include: a display interface that displays the second data stored in the storage. The display interface may change a display mode for each item included in the second data. In this case, the display mode is changed for each item included in the second data so that the display that makes it easy for the user to recognize the content can be realized.

Given above is a description of the present disclosure based on an exemplary embodiment. The embodiment is intended to be illustrative only and it will be understood by those skilled in the art that various modifications to constituting elements and processes could be developed and that such modifications are also within the scope of the present disclosure.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2021-035230, filed on Mar. 5, 2021, the entire contents of which are incorporated herein by reference.

What is claimed is:

1. A vehicle-mounted system comprising:
a vehicle-mounted apparatus that makes a hands-free call of a wireless apparatus possible; and
a communication apparatus that connects the vehicle-mounted apparatus to a network, wherein
the vehicle-mounted apparatus includes:
a first communication interface that communicates with the wireless apparatus to communicate an audio signal for the hands-free call by connecting to the wireless apparatus and receives first data stored in the wireless apparatus from the wireless apparatus;
a storage that stores the first data received by the first communication interface; and
a second communication interface that communicates, via the communication apparatus, with a server connected to the network, wherein
the second communication interface performs communication to synchronize second data that is stored in the server and that is backup data of the first data with the first data stored in the storage,
the second communication interface receives the second data from the server when the first communication interface cannot communicate with the wireless apparatus, and
the storage stores the second data received by the second communication interface.

2. The vehicle-mounted system according to claim 1, wherein
the second communication interface receives the second data from the server when the first communication interface cannot communicate with the wireless apparatus and can communicate with another wireless apparatus,
the first communication interface uses the second data stored in the storage in a hands-free call of the other wireless apparatus.

3. The vehicle-mounted system according to claim 2, wherein
the first data is call history data indicating a subject that the wireless apparatus communicated with in the past.

4. The vehicle-mounted system according to claim 3, wherein
the first data is telephone directory data registered in the wireless apparatus.

5. The vehicle-mounted system according to claim 2, wherein
the first data is telephone directory data registered in the wireless apparatus.

6. The vehicle-mounted system according to claim 2, further comprising:
a display interface that displays the second data stored in the storage, wherein
the display interface changes a display mode for each item included in the second data.

7. The vehicle-mounted system according to claim 1, wherein
the first data is call history data indicating a subject that the wireless apparatus communicated with in the past.

8. The vehicle-mounted system according to claim 7, wherein
the first data is telephone directory data registered in the wireless apparatus.

9. The vehicle-mounted system according to claim 1, wherein
the first data is telephone directory data registered in the wireless apparatus.

10. The vehicle-mounted system according to claim 1, further comprising:
a display interface that displays the first data stored in the storage, wherein
the display interface changes a display mode for each item included in the first data.

11. The vehicle-mounted system according to claim 1, further comprising:
a display interface that displays the second data stored in the storage, wherein
the display interface changes a display mode for each item included in the second data.

12. A vehicle-mounted system comprising:
a vehicle-mounted apparatus that makes a hands-free call of a wireless apparatus possible; and
a communication apparatus that connects the vehicle-mounted apparatus to a network, wherein
the vehicle-mounted apparatus includes:
a first communication interface that communicates with the wireless apparatus to communicate an audio signal for the hands-free call by connecting to the wireless apparatus and receives first data stored in the wireless apparatus from the wireless apparatus;
a storage that stores the first data received by the first communication interface; and
a second communication interface that communicates, via the communication apparatus, with a server connected to the network, wherein
the second communication interface performs communication to synchronize second data that is stored in the server and that is backup data of the first data with the first data stored in the storage,
the second communication interface receives the second data from the server when the first communication interface cannot communicate with the wireless apparatus and can communicate with another wireless apparatus,
the storage stores the second data received by the second communication interface, and
the first communication interface uses the second data stored in the storage in a hands-free call of the other wireless apparatus.

13. A method comprising:
communicating, by a first communication interface of a vehicle-mounted apparatus, with a wireless apparatus to communicate an audio signal for a hands-free call by connecting to the wireless apparatus;
receiving, by the first communication interface, first data stored in the wireless apparatus from the wireless apparatus;
storing, in a storage of the vehicle-mounted apparatus, the first data received by the first communication interface;
communicating, by a second communication interface of the vehicle-mounted apparatus, via a communication apparatus, with a server connected to a network;
performing, by the second communication interface, communication to synchronize second data that is stored in the server and that is backup data of the first data with the first data stored in the storage;
receiving, by the second communication interface, the second data from the server when the first communication interface cannot communicate with the wireless apparatus; and
storing, in the storage, the second data received by the second communication interface.

14. A method comprising:
communicating, by a first communication interface of a vehicle-mounted apparatus, with a wireless apparatus to communicate an audio signal for a hands-free call by connecting to the wireless apparatus;
receiving, by the first communication interface, first data stored in the wireless apparatus from the wireless apparatus;
storing, in a storage of the vehicle-mounted apparatus, the first data received by the first communication interface;
communicating, by a second communication interface of the vehicle-mounted apparatus, via a communication apparatus, with a server connected to a network;
performing, by the second communication interface, communication to synchronize second data that is stored in the server and that is backup data of the first data with the first data stored in the storage;
receiving, by the second communication interface, the second data from the server when the first communication interface cannot communicate with the wireless apparatus and can communicate with another wireless apparatus;
storing, in the storage, the second data received by the second communication interface; and
using, by the first communication interface, the second data stored in the storage in a hands-free call of the other wireless apparatus.

15. A vehicle-mounted apparatus comprising:
a first communication interface that communicates with a wireless apparatus to communicate an audio signal for a hands-free call by connecting to the wireless apparatus and receives first data stored in the wireless apparatus from the wireless apparatus;
a storage that stores the first data received by the first communication interface; and
a second communication interface that communicates, via a communication apparatus, with a server connected to a network, wherein
the second communication interface performs communication to synchronize second data that is stored in the server and that is backup data of the first data with the first data stored in the storage, the second communication interface receives the second data from the server when the first communication interface cannot communicate with the wireless apparatus, and the storage stores the second data received by the second communication interface.

16. A vehicle-mounted apparatus comprising:

a first communication interface that communicates with a wireless apparatus to communicate an audio signal for a hands-free call by connecting to the wireless apparatus and receives first data stored in the wireless apparatus from the wireless apparatus;

a storage that stores the first data received by the first communication interface; and a second communication interface that communicates, via a communication apparatus, with a server connected to a network, wherein the second communication interface performs communication to synchronize second data that is stored in the server and that is backup data of the first data with the first data stored in the storage, the second communication interface receives the second data from the server when the first communication interface cannot communicate with the wireless apparatus and can communicate with another wireless apparatus, the storage stores the second data received by the second communication interface, and the first communication interface uses the second data stored in the storage in a hands-free call of the other wireless apparatus.

* * * * *